(12) United States Patent
Lavens et al.

(10) Patent No.: US 11,768,164 B2
(45) Date of Patent: Sep. 26, 2023

(54) MESH HOLDER FOR SERIAL CRYSTALLOGRAPHY

(71) Applicant: UCHICAGO ARGONNE, LLC, Chicago, IL (US)

(72) Inventors: Alex A Lavens, Frankfort, IL (US); Gyorgy Babnigg, Countryside, IL (US); Darren A. Sherrell, Naperville, IL (US); Andrzej Joachimiak, Bolingbrook, IL (US); Youngchang Kim, Naperville, IL (US); Jessica L Johnson, Plainfield, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 768 days.

(21) Appl. No.: 16/903,601

(22) Filed: Jun. 17, 2020

(65) Prior Publication Data
US 2021/0396689 A1 Dec. 23, 2021

(51) Int. Cl.
*G01N 23/20* (2018.01)
*G01N 23/20025* (2018.01)
*G01N 23/207* (2018.01)

(52) U.S. Cl.
CPC ..... *G01N 23/20025* (2013.01); *G01N 23/207* (2013.01); *G01N 2223/60* (2013.01)

(58) Field of Classification Search
CPC .. G01N 23/00; G01N 23/20; G01N 23/20025; G01N 23/201; G01N 23/207; G01N 23/22; G01N 23/223; G01N 2223/60
See application file for complete search history.

(56) References Cited

U.S. PATENT DOCUMENTS

| 9,632,042 B2 | 4/2017 | Ren |
| 2010/0140497 A1 | 6/2010 | Damiano, Jr. et al. |
| 2016/0019994 A1 | 1/2016 | Cohen et al. |
| 2022/0091055 A1* | 3/2022 | Nam ........................ G01N 3/20 |

* cited by examiner

*Primary Examiner* — Nguyen Q. Ha
(74) *Attorney, Agent, or Firm* — CHERSKOV FLAYNIK & GURDA, LLC

(57) ABSTRACT

The invention provides a device for immobilizing and shipping crystals and for data collection via serial crystallography, the device having a first planar substrate defining a first transversely extending aperture, wherein the first substrate has a first laterally facing surface; a second planar substrate defining a second transversely extending aperture coaxial with the first aperture, wherein the second substrate has a second laterally facing surface; a third planar substrate and a fourth planar substrate positioned between the first and second substrates such that the first planar substrate, the second planar substrate, the third planar substrate and the fourth planar substrate are parallel; and a means for reversibly applying axial pressure to the first and second laterally facing surfaces so as to compress the third and fourth substrates together.

20 Claims, 8 Drawing Sheets

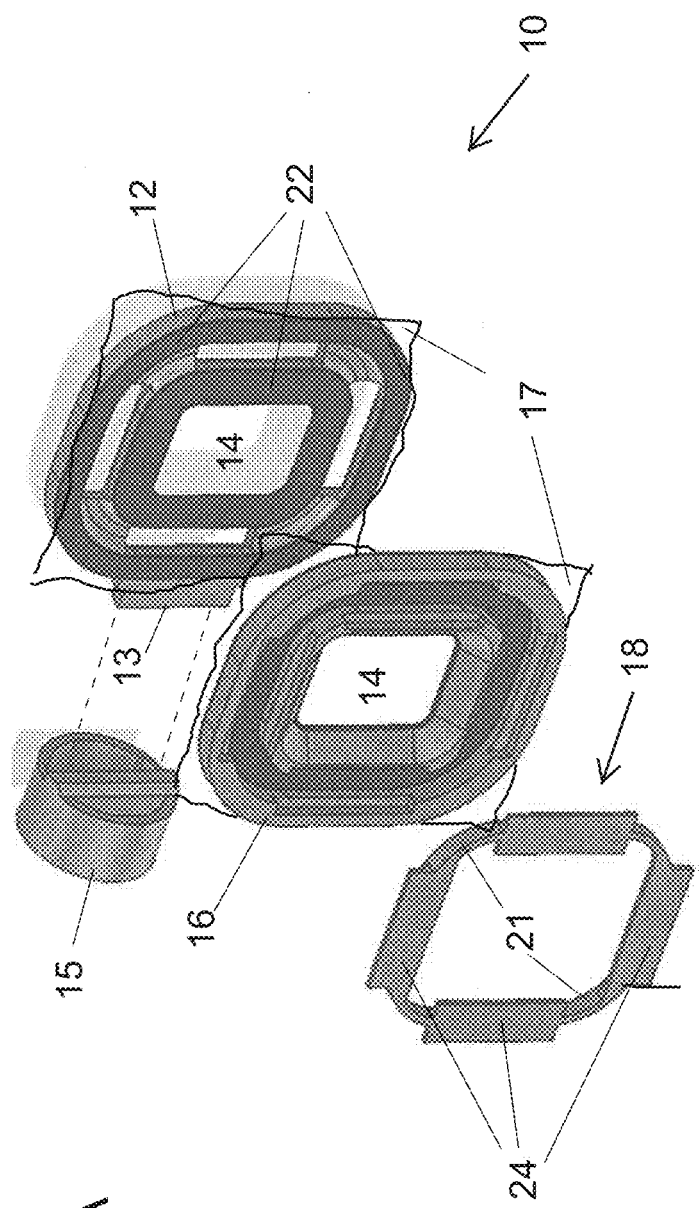

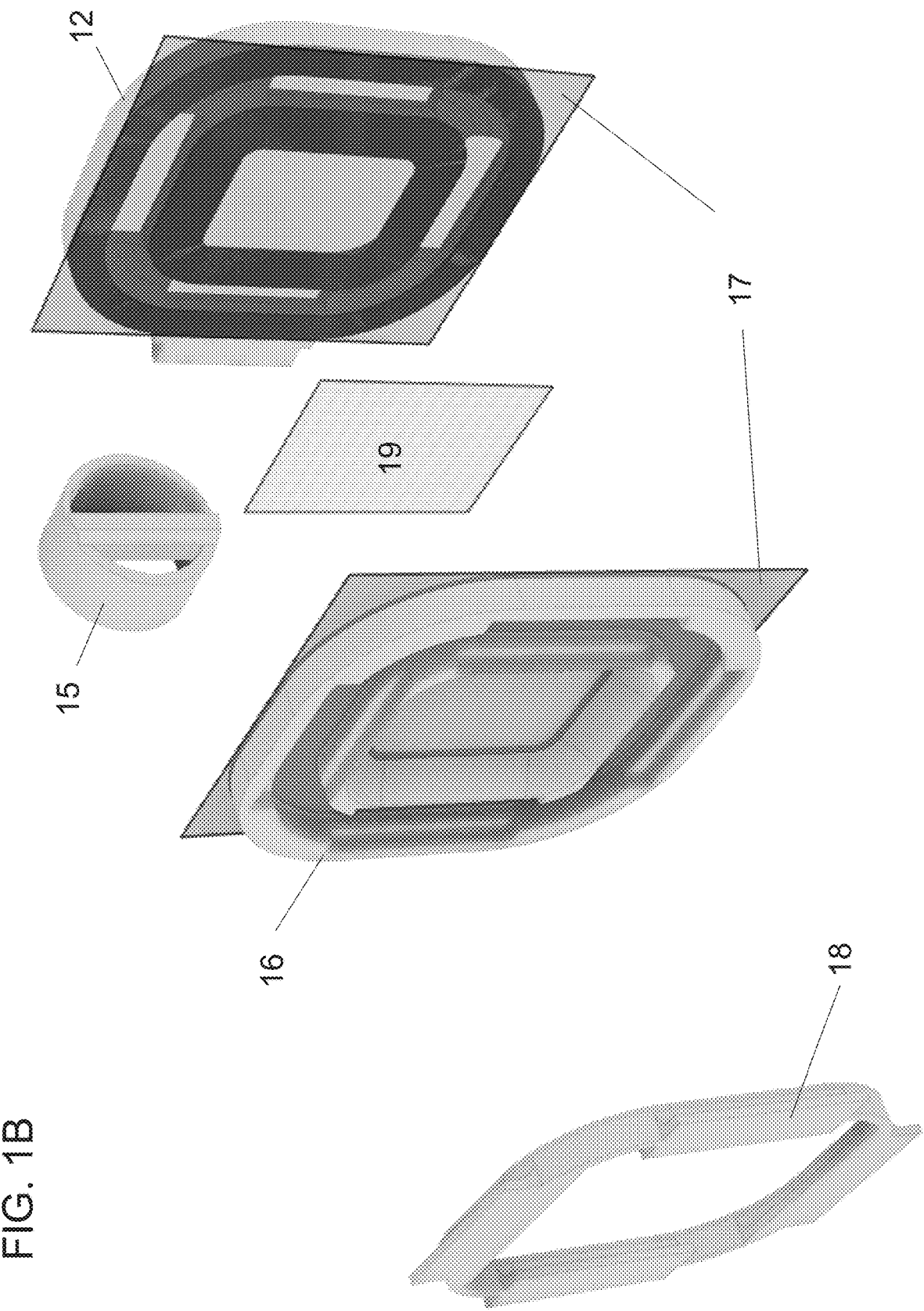

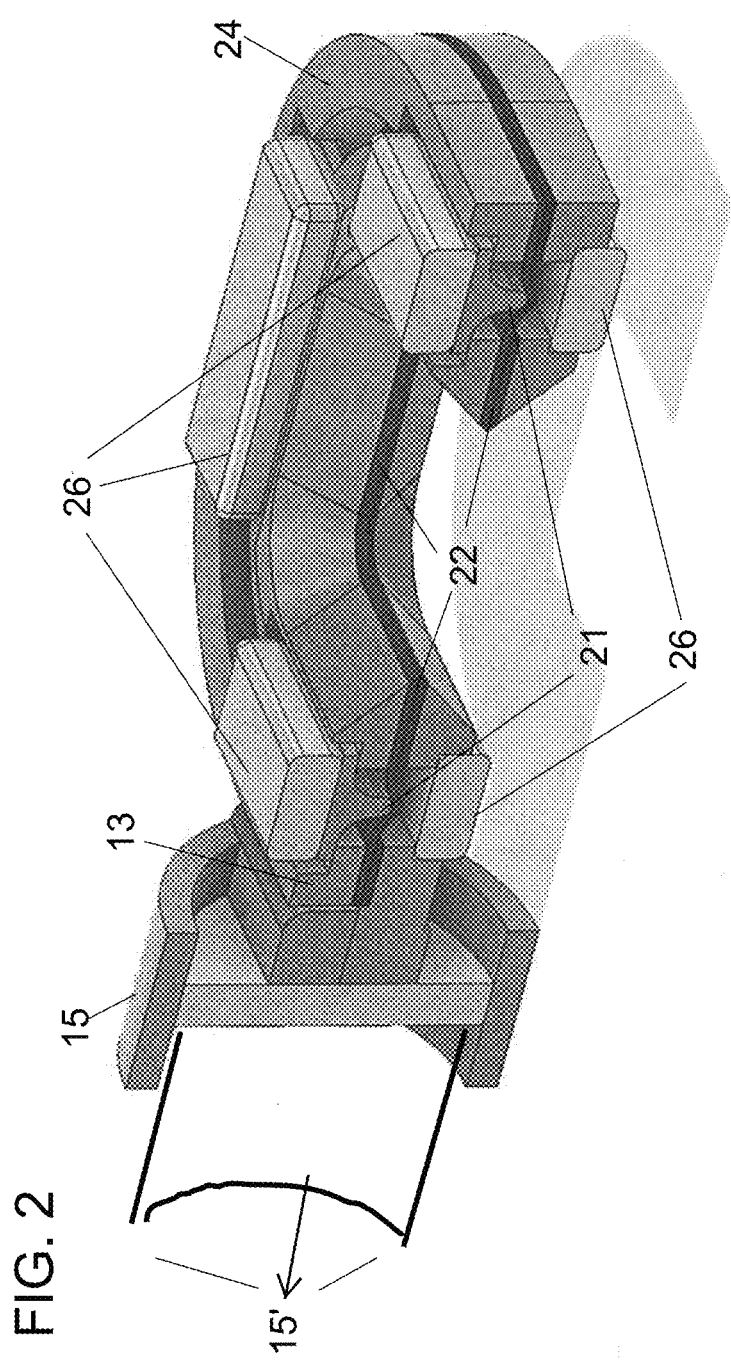

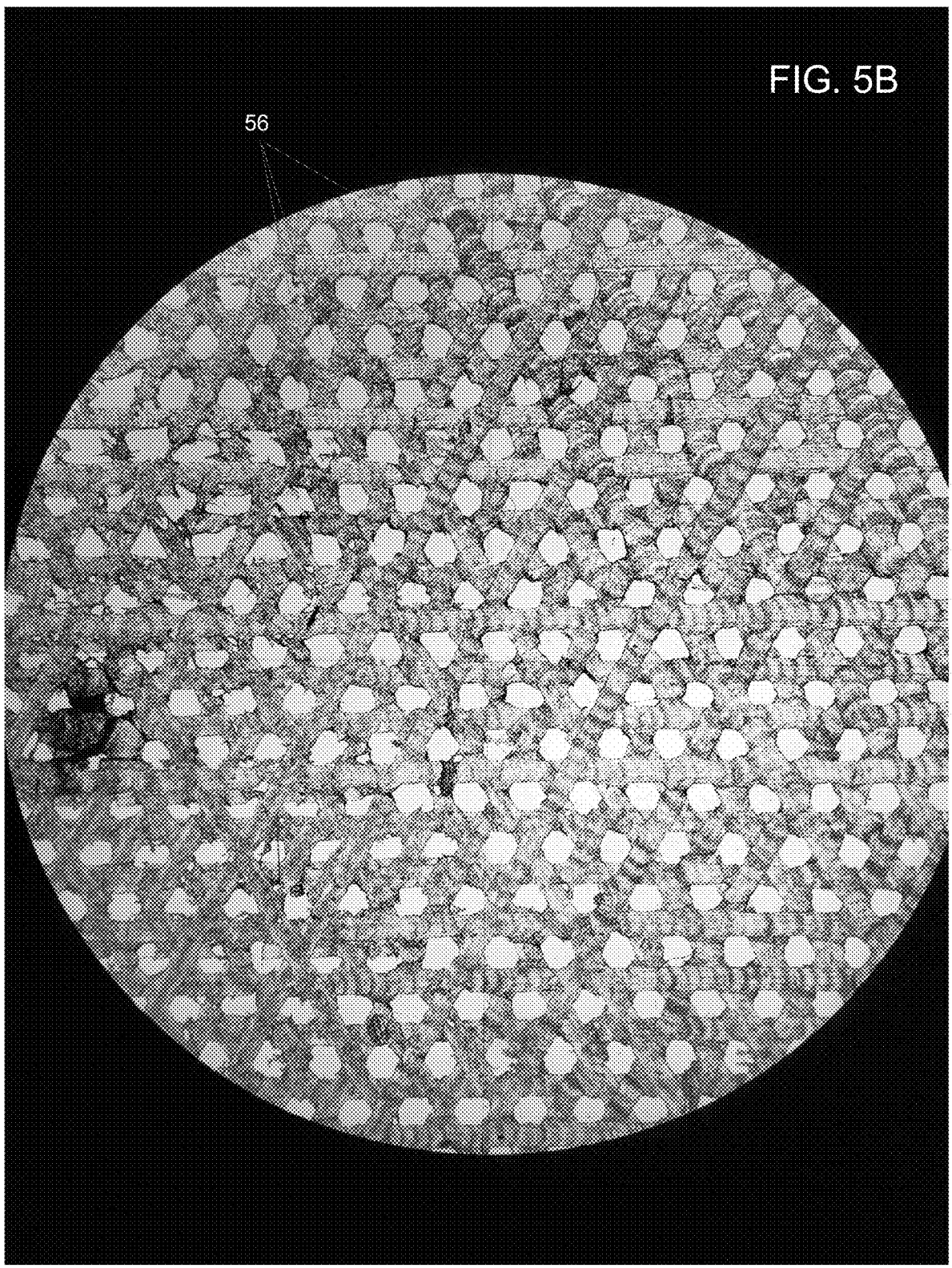

MESH HOLDER FOR SERIAL CRYSTALLOGRAPHY

CONTRACTUAL ORIGIN OF THE INVENTION

This invention was made with government support under Contract No. DE-AC02-06CH11357 awarded by the United States Department of Energy to UChicago Argonne, LLC, operator of Argonne National Laboratory. The government has certain rights in the invention.

BACKGROUND OF THE INVENTION

1. Field of the Invention

This invention relates to crystal imaging and more specifically, this invention relates to a device for collecting and securing small crystals for rapid x-ray diffraction imaging and a method for immobilizing the crystals.

2. Background of the Invention

Initial data collection methods for molecular crystallography were limited to using a single crystal or at the most very few crystals at any one time. This was referred to as "non-serial" or standard crystallography.

Usually, the crystal was rotated in an x-ray beam at cryogenic temperatures to protect the structure of the crystal from radiation damage.

Non-serial crystallography technology has a lexicon associated with it, including "single-crystal," "pin," and "cryo." "Single" refers to one or very few samples imaged at one time, typically less than five; that crystal or few crystals perched at the end of a pin inserted in the line of path of the beam line. Each image contains diffraction from one crystal, or very few crystals if crystal overlap occurs. 'Pin' refers to the typical delivery device, for example, an 18.5 mm long pin. 'Cryo' refers to cryogenic cooling of these samples.

Serial crystallography, in contrast to "non-serial" crystallography, analyzes/images tens, hundreds, or thousands of crystals in a rapid series (aka "serial"). Serial crystallography is not single-, pin-, cryo-, standard- or normal crystallography. As such, it is a more rapid method for exposing crystals to x-rays and generating data from such exposure.

The recent emergence of using fixed targets (e.g., Nylon mesh) as a method to capture and immobilize crystals for free electron laser (XFLs) and traditional synchrotron facilities based serial crystallography has created the need for a method of holding the sample holding device and delivering, protecting, and presenting the crystal samples to x-rays in a reliable, cost effective, and user friendly way. This holder needs to be unfailing (e.g., reliable), accepting, and protecting variable and fragile crystal samples from drying. The holder should also present the crystals in a reproducible way and be solidly constructed so as to prevent sample shaking or vibrating due to the quick movements of the synchrotron equipment (e.g., motors) during serial crystallography data collection. The holder should also keep the samples viable for the time required between loading and data collection at the beamline.

Others have used complicated or expensive configurations for holding the mesh in place, many requiring reconfiguration of a synchrotron beamline. Some sample holders for Nylon mesh require 8 to 10 separate pieces in order to seal the mesh and the solution. See, for example D. Lee et al. *SCIENTIFIC REPORTS* (2019) 9:6971.

These more complex methods introduce multiple points of failure and would be time consuming to create in large quantities. Also, these past protocols have sandwiched Nylon mesh between polyimide sheets, which is a commonly used material in x-ray applications. But while polyimide is used in x-ray applications, it is not transparent, resulting in high background solution when imaged with a microscope. (Higher background is produced by x-ray scattering from materials that surround the sample and reduce signal to noise and decrease quality of the data.) The ability to image the sample with a microscope prior to data collection via x-ray provides additional valuable information otherwise missed (e.g. high-resolution crystal images, presence of a fluorescent signal, etc.).

Alternative methods for serial crystallography such as silicon chips are very reliable but very costly to produce and have complex loading and sample collection procedures. For example, these methods require large separate motorized stages and kinematic mounts.

Generally, beamlines are complex. Installing non-serial or serial equipment within those lines requires a great deal of time and some retrofitting.

A need exists in the art for a system and method for collecting data from a large number of crystals using serial crystallography, yet produced with very small amounts of target material. The system should define a very small foot print, and include stages that are built into the beamline or modularly designed for easy placement and use as to prevent reconfiguration of an entire beamline. Also, the system and method should be well suited for data collection at synchrotrons and other light sources, including XFELs.

SUMMARY OF INVENTION

An object of the invention is to provide a device and a method for positioning crystals on a beamline that overcomes many of the drawbacks of the prior art.

Another object of the invention is to provide a device and method for positioning crystals on a beamline. A feature of the invention is that it comprises no more than three separate pieces which are reversibly assembled. An advantage of the invention is that it can be assembled and disassembled quickly, and without tools.

Still another object of the invention is to provide a simple, reversibly assembled device and method for immobilizing and shipping crystals. A feature of the invention is that it has a total of three separate pieces. Alternatively, the device may comprise just two portions of a housing, with magnets integrally molded within each half. An advantage of the device is that a customer can load the device with the sample, then forward the loaded device to a beamline for analysis.

Yet another object of the present invention is to provide a compact means for immobilizing sample fluids for crystallography analysis. A feature of the device is that it comprises a crystal holding mesh with cells printed thereon in a predetermined pattern, wherein the mesh is sandwiched between two sheets of Mylar or some other transparent substrate. (Whereas current crystal deposition films are utilized with their natural topographies, the invented printed mesh provides flexibility to optimize data collection for crystal populations of varying sizes.) The Mylar-printed mesh-Mylar construct is sandwiched between two rigid substrates (rigid relative to the Mylar-mesh-Mylar construct. The relatively rigid substrates are integrally molded with sealing material such that when the substrates are combined, a hermetic seal prevents fluid communication between the cells and the ambient atmosphere. An advantage of the device is that it can fit in the same place as a standard cryo-crystallography pin sample without rearrangement of the beamline. The invented device utilizes the same loading morphology (e.g., magnetic arrangement) as current sample holders.

Still another object of the present invention is to provide a method and device to enable efficient imaging of crystals. A feature of the invention is that the device is easily and quickly installed and removed in and from a beamline. An advantage of the invention is that set up and tear down times are 10-20 minutes.

Briefly the invention provides a device for immobilizing and shipping crystals, the device comprising: a first planar substrate defining a first transversely extending aperture, opening, wherein the first substrate has a first laterally facing surface; a second planar substrate defining a second transversely extending aperture coaxial with the first aperture, wherein the second substrate has a second laterally facing surface; a third planar substrate and a fourth planar substrate positioned between the first and second substrate such that the first planar substrate, the second planar substrate, the third planar substrate and the fourth planar substrate are parallel; and a means for reversibly applying axial pressure to the first and second laterally facing surfaces so as to compress the third and fourth substrates together.

In an embodiment of the invention, the aforementioned third and fourth substrates are Mylar. A crystal immobilization substrate such as 3D printed Nylon may be sandwiched between the third and fourth substrates. Those third and fourth substrates are then hermetically sealed together.

BRIEF DESCRIPTION OF DRAWING

The invention together with the above and other objects and advantages will be best understood from the following detailed description of the preferred embodiment of the invention shown in the accompanying drawings, wherein:

FIG. 1A is an exploded view of a device for holding crystals, in accordance with features of the present invention;

FIG. 1B is a perspective view of a Mylar-Nylon Mesh-Mylar construct, in accordance with features of the present invention;

FIG. 2 is a cross-sectional view of an assembled device for holding crystals, in accordance with features of the present invention;

FIG. 5B is a photomicrograph of a 3D printed mesh showing hexagonal shaped cells, in accordance with features of the present invention.

DETAILED DESCRIPTION OF THE INVENTION

Figure 3:
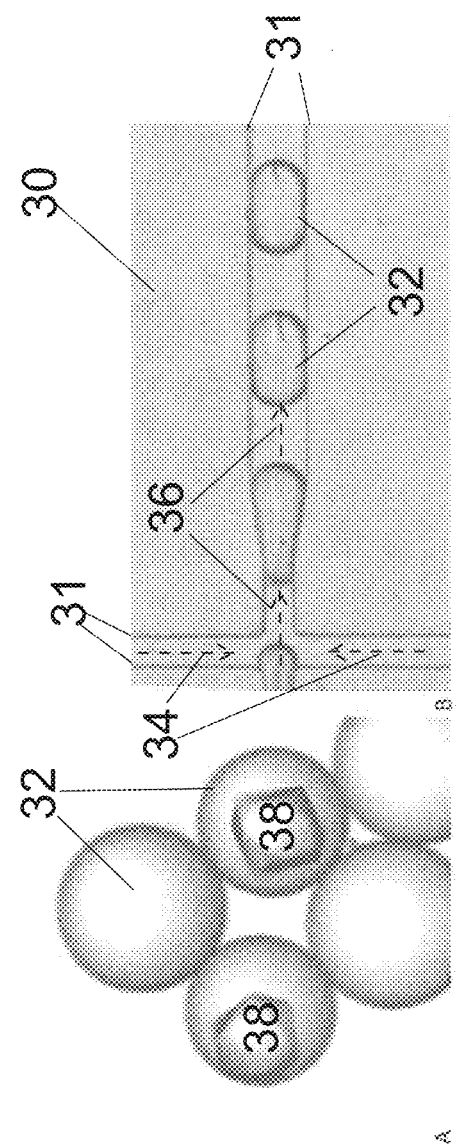
FIG. 3 depicts crystals encapsulated by microdroplets in a crystal droplet generator, in accordance with features of the present invention.

The foregoing summary, as well as the following detailed description of certain embodiments of the present invention, will be better understood when read in conjunction with the appended drawings.

All numeric values are herein assumed to be modified by the term "about", whether or not explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

The following detailed description should be read with reference to the drawings in which similar elements in different drawings are numbered the same. The drawings, which are not necessarily to scale, depict illustrative embodiments and are not intended to limit the scope of the invention.

As used herein, an element or step recited in the singular and preceded with the word "a" or "an" should be understood as not excluding plural said elements or steps, unless such exclusion is explicitly stated. As used in this specification and the appended claims, the term "or" is generally employed in its sense including "and/or" unless the content clearly dictates otherwise.

Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

This invention solves the problems of having to rearrange a beamline for serial mesh experiment. Rather, the invented holder is designed to be fully compatible with a non-serial crystallography beamline, wherein its mounting hardware, combined with the body of the actual mesh holder is the same length of a standard crystallography pin. As such, the sample bed resides within the beamline and may present sample areas laterally disposed from the beam for serial analysis. For example, the center of the sample area of the mesh holder is about 18.5 mm from the loading base, which is the length of aforementioned pins, so that the sample area presents a sample bed that is several magnitudes higher in volume and surface area than the tips of pins onto which the samples normally reside. The mesh holder (which may be 3D printable) also magnetically mounts as a standard crystallography pin, enabling installation as-is on any single-crystal crystallography beamline.

FIG. 1A generally designates the device as numeral 10. A first substrate 12 is provided, with center regions of the substrate forming an aperture 14 or plurality of apertures. This aperture(s) define(s) the sample area of the mesh holder, discussed infra. A second substrate 16 is designed to combine with the first substrate co-planarly and/or coaxially such that their apertures 14 align.

A bracket 15 or other means is provided to reversibly receive a radially extending boss 13 of either the first or second substrate. Securement of the boss may be via friction fit, or by a threaded bolt and mating aperture configuration. Aspects of the bracket 15 are adapted to be removably received by a portion 15' (FIG. 2) of a synchrotron.

In instances where magnets are not embedded within the second substrate 16, a separate magnet support 18 substrate such as the circular configuration (element 18 in FIG. 1A) embodies either a protrusion or a trough for mating with complementary surfaces of the first 12 and second 16 substrates, where the first or second substrate embodies receiving magnets to mate with the support substrate 18. The separate magnet support substrate 18, defining a center aperture, is positioned on an exterior side of the second substrate 16 so as to lie in registration with the apertures 14 of the first substrate 12 and second substrate 16.

Turning to FIG. 1B, in an embodiment of the invention, clear Mylar sheets 17 are used for their low x-ray background characteristics and their compatibility with obtaining high-resolution images with a microscope. Protein crystal affixed upon a mesh 19 of nylon or other suitable material is sandwiched between the sheets 17. The afore-described protrusion-trough configuration provides a means for reversibly securing a periphery of the Mylar-crystal containing mesh-Mylar construct.

As mentioned supra, in an embodiment of the invention, clear Mylar sheets are used for their low x-ray background characteristics and their compatibility with obtaining high-resolution images with a microscope. The afore-described protrusion-trough configuration provides a means for reversibly securing a periphery of the Mylar-crystal containing mesh-Mylar construct.

Magnetic Coupling Detail

Upon positioning of the crystal carrying substrate between the first and second substrate, a first magnet or first plurality of magnets arranged generally in a circumferential configuration (element 24 in FIG. 1A) is positioned upon the laterally facing surface of the second substrate 16. Ferrous materials and/or second magnets contacting the first substrate 12 are attracted to the first magnet(s), thereby imposing axial pressure to the entire assembly. This hermetically seals the Mylar-Crystal Containing Mesh-Mylar construct.

In summary, the hermetic seal is created by the first magnets (contacting the second substrate 16) being magnetically attracted towards magnets or ferrous materials contacting the first substrate 12.

Alternatively, and as shown in FIG. 2, the circumferential magnetic configuration 18 may define a first exterior facing surface and a second interior facing surface, the interior facing surface terminating in an axially extending ridge or protrusion 21. A relatively flexible membrane 22 positioned between the first 12 and second substrate 16 is also shown. In an embodiment, the first surface of the circumferential magnetic configuration comprises symmetrically positioned plateaus 24 coplanar with each other and parallel with the axially facing surfaces of the first 12 and second 16 substrates. These plateaus 24 are adapted to each receive magnets, 26, such that the magnets are supported by the plateaus such as to be removably received by the plateaus and not necessarily completely encapsulated by the circumferential magnetic configuration 18. As such, the magnets may be applied or removed sequentially to allow for easier assembly or disassembly of the first-, second-, third-substrate construct.

The second surface of the circumferential magnetic configuration 18 terminates in the axially directed ridge or protrusion 21. The axially directed ridge 21 flanks the afore-described plateaus 24 and connects the plateaus to define a continuous ring. Via magnetic attraction, the protrusion is drawn through and flexes the relatively flexible sealing membrane 22 positioned between the more rigid first 12 and second substrates 16. This creates a protruding ridge 21 which in turn extends into the receiving trough of element 12. The distal edge of the ridge is shown in FIG. 2 as contacting and depressing the third substrate toward the first substrate 12 when the circumferential magnetic configuration overlays the second substrate 16. This axial compression of the third substrate 22 between the first 12 and second 16 substrates provides a means for sealing off fluid communication between the interior environment of the device and the device's ambient surroundings, which is to say humidity, air flow, and temperature of the atmosphere bathing the entire device 10.

The relatively more flexible membrane 22 may be integrally molded to opposing surfaces of the first 12 and second substrate 16. There may be one membrane disposed between the first and second substrate, or more than one. In an embodiment of the invention, two flexible membranes 22 sandwich films (designated as "film" in FIG. 1 containing the crystals to be examined, such that a first flexible membrane overlays the surface of the first substrate 12, and a second flexible membrane overlays the surface of the second substrate 16. The film may be Mylar, Nylon mesh, or a combination thereof. One exemplary construct comprises Nylon mesh sandwiched between an optically transparent material such as Mylar, which has a low x-ray background: sheets of which are compatible with obtaining high-resolution images via x-ray crystallography. The flexible membrane or membranes 22 may further comprise a sticky surface to removably fix the film to the membrane. This will cause the film to remain stationary vis-à-vis the membrane and therefore provides a means for keeping the film from shifting during loading into the invented holder.

In instances where the first 12 and second 16 substrates further comprise magnets embedded within their structures, a periphery of the second substrate may define an axially directed protrusion, while a periphery of the first substrate may define an axially directed trough adapted to receive the protrusion. Conversely, the periphery of the second substrate may define an axially directed trough while the periphery of the first substrate may define an axially directed protrusion. The protrusion may be continuous about the periphery, so likewise the trough.

Other means for imposing axial pressure include bolts, clips, friction, electromagnetic forces, suction, and combinations thereof.

The membrane 22 may be removably received by the substrates. However, the inventors have devised a trouble-free method, outlined infra, for printing relatively hard substrate onto the membrane 22. This trouble-free method minimizes the number of parts required for assembly and disassembly of the device, thereby expediting the loading and forwarding of samples to waiting beamlines.

As noted supra, crystals are deposited on a beam-line transparent material such as a mesh. The material may be selected from the group consisting of Nylon, Mylar, polyimide film such as Kapton® (Dupont), cyclic olefin copolymer (COC). Graphene, and combinations thereof. Mylar is preferred inasmuch as it is substantially transparent to x-ray radiation in the thicknesses utilized. (Suitable ranges are between 1 um-50 um thick.) Generally, the mesh is then sandwiched between two sheets of Mylar or some other equally transparent material. For example, a Mylar-Nylon-Mylar sandwich is then placed between the first 12 and second 16 substrates, and magnets are applied to provide a hermetic seal to prevent fluid exchange with the surrounding atmosphere. Depending on the material chosen, the seal may maintain a crystal sample residing on the mesh (the mesh shown in phantom) for days or possibly weeks, thereby minimizing any crystal degradation due to evaporation, heat, handling, etc.

FIG. 1A depicts the device with two sheets of sandwich films ("film") depicted in dotted lines. FIG. 1B shows a Nylon mesh positioned between those two films.

This sandwich configuration (comprising for example Mylar-Nylon mesh-Mylar) axially compressed results in the three-layer construct being hermetically sealed between the first substrate 12 and second substrate 16. This assures that samples sealed within the construct will remain viable when shipped from anywhere in the world to awaiting beamline locations.

Crystal Loading Detail

The inventors have devised a method for trapping a large Nylon mesh sandwiched in between two Mylar sheets to trap microfluidic droplets. The method is also compatible for trapping batch crystal slurry. The establishment of the hermetic seal is particularly relevant when the Nylon, Mylar or other similar substrate contains crystal inasmuch as the crystal may be in a fluid, liquid or matrix (lipid cubic phase, for example).

A droplet crystallography protocol is provided which yields narrow crystal size distribution, protects crystals during handling, provides lowered background during data collection, lowers evaporation problems, and facilitates even distribution in a mesh. As depicted in FIGS. 3A and 3B, microfluidic droplets 32 (ranging in size from 30 to 150 microns, and preferably from 50-100 microns) may be generated by a microfluidic chip 30 with 2 inlets for protein and screen reagents and one inlet for fluorinated oil. The inventors found that perpendicular flow of fluorinated oil 34 to the flow 36 of aqueous reagents creates the aqueous droplets 32 in which the crystals 38 are formed. Droplet sizes are controlled by the geometry of the microfluidic channels 31 as well as by the relative flows of oil and aqueous streams.

Protein solution and screen reagent are withdrawn into separate fluorinated ethylene propylene (FEP) tubing attached to microfluidic pumps. Next, the lines are connected to the inlets of the microfluidic chip. The third inlet in the chip is connected to a syringe containing fluorinated oil with surfactant (e.g., Bio-Rad®, Hercules, CA, droplet-generation oil) via an FEP syringe. The concurrent laminar flow of protein and screen reagent creates a stream perpendicular to an incoming stream of fluorinated oil, which partitions the reagent stream into droplets. The resulting droplets are collected in a micro-centrifuge tube and incubated at an optimal temperature (e.g. 16° C.) until crystals appear in the droplet. Small aliquots (<1 uL) are withdrawn into flat capillary tubes, sealed and observed under a microscope for monitoring crystal growth.

The protocol for using microfluidic droplets includes trapping the droplets in the mesh, imaging the assembly with a confocal microscope prior to data collection at the beamline, and storing the samples until data collection. High-resolution images collected via confocal microscopy provide a means to assess the crystal size distribution and expected loading efficiency of the chip. Images can also drive data collection, focusing only a small area of the chip, avoiding empty regions, therefore optimizing the use of time at the beamline.

Figure 4:
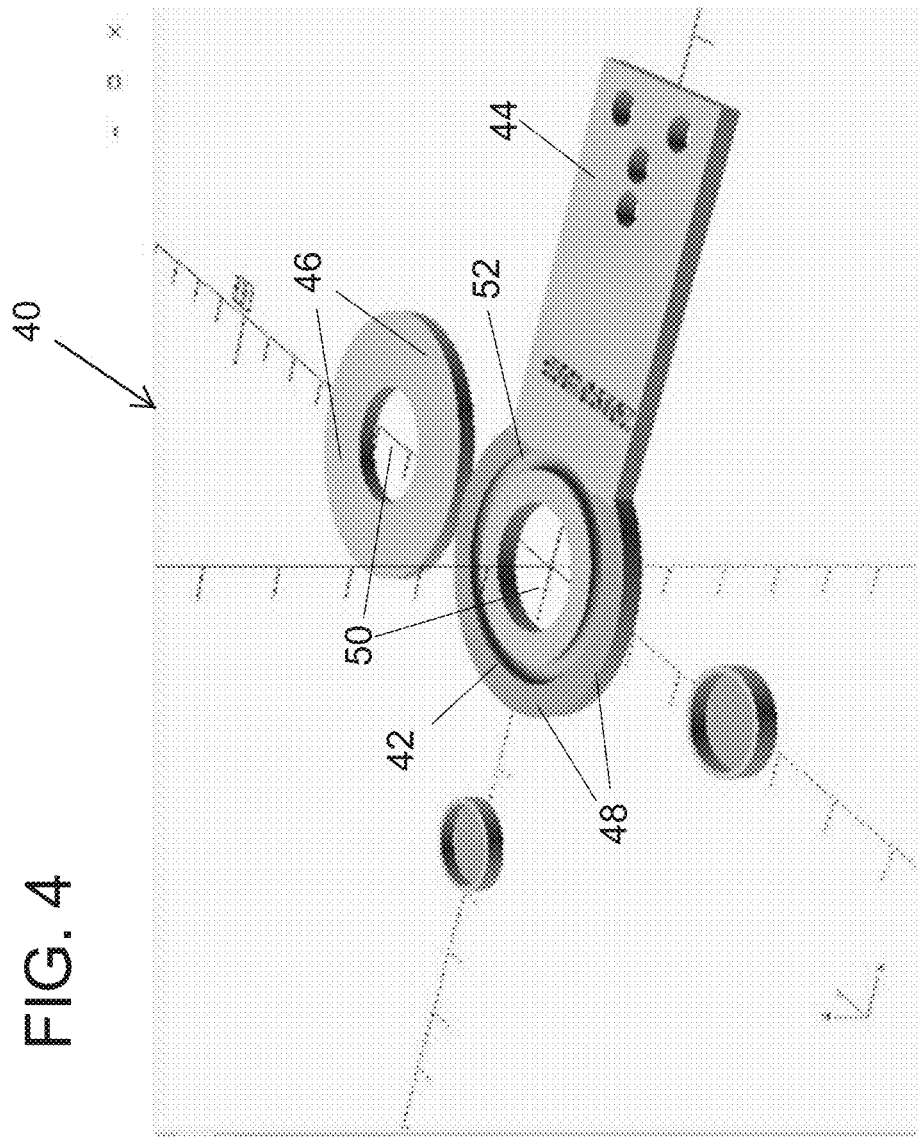
FIG. 4 is a perspective view of a microscope stage adaptor, in accordance with features of the present invention.

Further disclosed herein is a microscope stage adaptor for imaging, depicted in FIG. 4 as numeral 40. The adaptor may be manufactured via laser cutting or via 3D printing. The adaptor may be disseminated to the scientific community and easily modified to interface other microscope stages.

The adaptor comprises a first end 42 adapted to interact with the objective of a microscope, and a second end 44 adapted to accommodate a user's hand in the positioning of same, or for end-use with a magnetic kinematic base interfacing a stepper motor for data collection at the beamline. An exemplary magnetic mounting apparatus is commercially available as part number KB25/M manufactured by ThorLabs (Newton, New Jersey).

The first end further comprises a top substrate or lid 46 and a bottom substrate 48 complementary in cross section to the top substrate. Both substrates define a center aperture 50 adapted to accommodate a light stream from a microscope or some other imaging device. Positioned in registration, the top and bottom substrates are further adapted to secure a Mylar-Nylon-Mylar construct (not shown), similar to the construct described supra.

A surface of the bottom substrate 48 further defines a peripherally extending channel 52 such that the channel circumscribes the entire periphery of the substrate 48. This channel 52 is adapted to receive an O-ring. The surface with the O-ring and the opposing flat surface provides a tight seal preventing evaporation for weeks. Surprisingly and unexpectedly, the flat surface design provided a means for maintaining the samples undisturbed for weeks. This made the entire construct optimal for both short- and long-distance shipping.

In operation, an O-ring is loaded in the channel 52 of the bottom substrate 48. Then, a crystal-sequestering Mylar-Nylon-Mylar construct is placed between the top substrate 46 and bottom substrate 48. Finally, the top substrate 46 is placed in registration with the bottom substrate 48 and axial pressure is applied to the external surfaces of the top and bottom substrates. The axial pressure can be generated by topically applied and reversibly received magnets, or embedded magnets, similar to the above design. This establishes a hermetic seal such that the Mylar-Nylon-Mylar substrate 48 is not in fluid communication with the ambient atmosphere surrounding the device. Means for imparting axial pressure may be temporary such as to include alligator clips, tape, or hook and pile wrapping. More robust means for imparting axial pressure may include threaded bolt and aperture configurations such that bolts are slidably received through transverse holes in the top substrate to mate with threaded apertures formed in the bottom substrate. In the alternative, a plurality of magnets may be embedded within the substrate to impart axial pressure. Such means for imparting axial pressure ensures that the construct is not breached or otherwise opened during shipping, thereby assuring integrity of the samples. In addition, the axial pressure ensures hermetic sealing and minimizes evaporation from the samples.

It is noteworthy that the inventors' protocol of printing directly on Mylar, that protocol discussed infra, obviates the need for a third party Nylon mesh, thereby further streamlining the assembly and dis-assembly process.

Device Manufacturing Detail

A salient feature of the invention is that the components of the device can be produced via 3D printing. Generally, the first 12 and second 16 substrates may be comprised of plastic, glass, metal, carbon fiber, and combinations thereof. As discussed above, magnetizable material such as ferrous substances may be part of the components of the substrates. In an embodiment of the invention, the ferrous substances may be homogeneously dispersed throughout the two substrates 12, 16. Alternatively, magnets may be placed on each exterior facing surface of the first substrate 12 and the second substrate 16 so as to affect axial compression via magnetic attraction.

The following is an exemplary description of 3D printing parameters for combining the flexible 28 and inflexible materials 12, 16 of the mesh holder. Other parameters not listed may be empirically determined or left in the default state. A myriad of printable materials is suitable including flexible or rigid materials. Flexible materials include, but are not limited to, thermoplastic polyurethanes (TPU), such as NinjaFlex™ (NinjaTek, Manheim, PA) in combination with relative ridged material such as polylactic acid (PLA) or Nylon. More ridged materials include, but are not limited to ABS, PP, CPE, and any ridged printable material that can suitably bond to the NinjaFlex material.

An exemplary 3D printer slicing application is the open-source, Cura, available through Ultimaker (Geldermalsen, Netherlands). The Ultimaker Cura software lists a large number of parameters that can be manipulated to change firmware behavior. Some of those parameters are listed in Table 1 below, wherein a solid material (such as PLA or Nylong) and TPU are utilized.

Parameters using other printable materials is determined empirically, in the normal course of 3D printing usage and/or with assistance provided by commercial suppliers of those materials.

TABLE 1

3D Printer Parameters for Generating Flexible and Inflexible Substrates

| Parameter: | Hard Material Value: | Flex Material Value: | Description: |
| --- | --- | --- | --- |
| Layer Height | 0.06-0.1 mm | | The height of each layer of deposited material. The parameter has an effect on the dimensions/accuracy of the mesh holder and the function of the flexible layer. (i.e. too thick isn't flexible, too thin doesn't bond to the hard plastic component) |
| Infill Density | 100% | | Controls the density of the print. 3D prints can be either empty shells or solid objects. 100% was used to ensure rigidity of the hard plastic. |
| Infill Pattern | Triangles | Cross 3D | The pattern the printer uses to infill the print. These are different due to the different characteristics of the materials and to ensure bonding between the two. |
| Printing Temperature | Material Dependent | 225-230 C. | Temperature used to melt the material in order to deposit it. The two materials melt at different temperatures, and the Flex Material temp was raised from default to ensure the flex material is still pliable when the hard material is deposited onto it to ensure proper bonding. |
| Build Plate Temperature | 60 C. | | Controls the temperature of the base plate that the print is constructed on. This is kept at a higher temp than default in order to keep the flex material warm prior to printing the hard material. The ensures consistent bonding since the flex material isn't fully cured. |
| Print Speed | Material Dependent | 20-23 mm/s | Controls how quickly the print head moves while depositing the material. Due to different material characteristics these are different for each. |
| Fan Speed | 100% | 20% | Controls cooling fan speed while printing material. For the flexible material it is intentionally set low to prevent the material from fully solidifying before the hard material is deposited on top. This ensures a strong bond between the two. |
| Prime Blob | Enabled | | Ensures the printer had material primed before attempting to print deposit material. Mainly to ensure consistent performance and prints. |
| Build Plate Adhesion Type | Skirt or Brim | | Adhesion type is used to keep the print from pulling up from the build plate while printing. This can occur from the previous printed material cooling and shrinking before the print is fully complete. Skirt and Brim provide different characteristics. Skirt eliminates post-processing on the print but is less consistent. Brim will be more reliable but needs post processing to removing the brim. |
| Build Plate Adhesion Extruder | Use Hard Material | | It is preferable to use the harder material for the adhesion extruder as the hard plastic will ensure the rest of print does not move from the plate. If the flex material is used, as the print |

TABLE 1-continued

3D Printer Parameters for Generating Flexible and Inflexible Substrates

| Parameter: | Hard Material Value: | Flex Material Value: | Description: |
|---|---|---|---|
| | | | begins to pull away it will just stretch with it and not prevent movement. |
| Enable Prime Tower | Disabled | | Controls material preparation between switch to different materials. This is disabled as it takes more time between printing the flex material and the hard material allowing the hard flex material to cool enough to prevent consistent bonding. |
| Skirt Distance | | 0 mm | Manipulated as such to provide proper adhesion but to prevent extensive post processing requirements |

Printing parameters, including those in Table 1, may be empirically determined or left in the default state for the respective materials while printing with the Cura software. Adhesion parameters (selected as Skirt for build plate adhesion type and Extruder 1 for build plate adhesion extruder) were used to trick or otherwise induce the printer into a desired outcome.

A "Skirt Distance" of zero was utilized. It is usually a much larger number and is not supposed to contact the model being printed, however by making this value zero, a thin layer of the material comes into contact with the models being printed which acts to adhere the devices to the glass print bed. This is necessary because some materials tend to warp if not adhered (Nylon being one of them). By creating a thin layer of material to hold the device down during printing, the integrity of the print remains while the excess material can simply be removed after the print is complete. A Skirt/Brim Minimum length of 250 was designated.

Mesh Printing Detail 3D printed mesh was designed to combine experimental flexibility with the ease and other user-friendly attributes that come with using Nylon mesh. This is accomplished by using a 3D printer to deposit an extremely thin (between about 0.05 and 0.1 mm) layer of material in a pattern with specifically sized wells and thickness to immobilize crystals. For example, the inventors have consistently achieved 0.06 mm thicknesses.

These wells can vary in size, shape, and thickness, which increases the flexibility of this invention for use in different experiments. The printed mesh is produced to the same thickness as Nylon mesh currently being used in serial experiments (0.060 mm or less).

A major benefit in using 3D printing technology to generate the mesh is that the grid/pattern of cells or wells can also vary in size, thickness. The cell or well spacing for various crystal sizes, and can have various shapes to optimize for different experiments. State of the art relegate users to a single cell size and shape (square), and certainly no patterned size changes or gradients on the same mesh substrate. The instant 3D print generation of cells can enable the cells or wells to be laid out in grids, which can be assigned specific locations along a 2D matrix.

The 3D printed cells or wells are varying sizes and define geometric shapes selected from the group consisting of circles, squares, polygons, hexagons, spheres, cubes, pyramids, geodesic polyhedrons and combinations thereof and combinations thereof. For example, a variety of cell sizes can be printed. Exemplary sizes range from 10 to 200 micrometers in cross section.

Figure 5A:
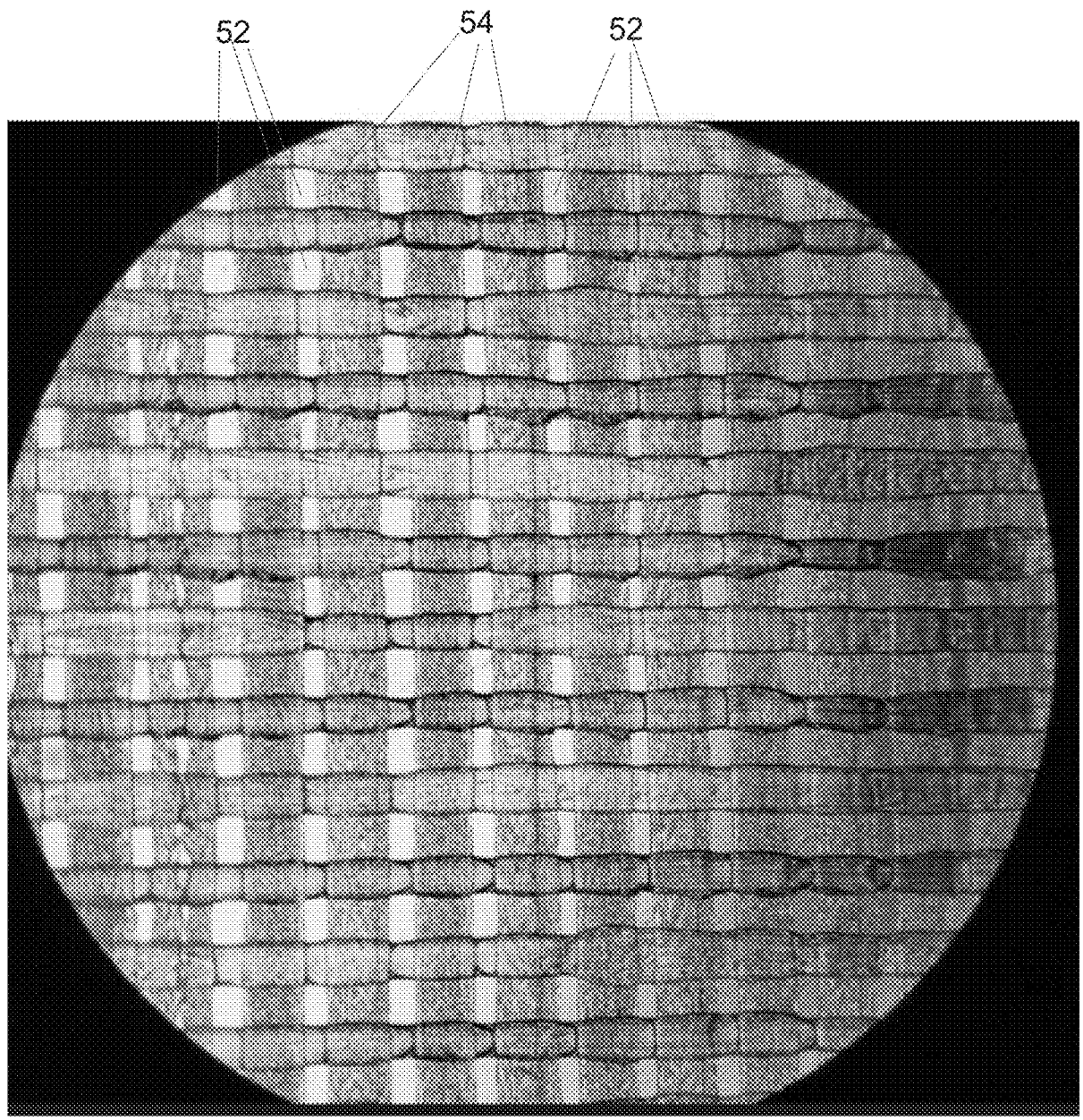
FIG. 5A is a photomicrograph of a 3D printed mesh showing square cells for holding crystals, in accordance with features of the present invention.

FIG. 5A is a photomicrograph of a 3D printed mesh generated by the invented method for use in characterizing crystals. Generally designated as numeral 50, the mesh comprises square cells 52 adapted to receive and sequester liquids containing crystals for analysis. It is noteworthy that a myriad of cell geometries may be utilized, including squares, triangles, circles, polygons (such as hexagons discussed supra), and a combination of these shapes. In addition, and as depicted in FIGS. 5A and 5B, the cells may be arranged in horizontal rows, vertical columns, and combinations thereof to form a matrix of cells. Alternatively, the cells may be arranged in horizontal rows with adjacent cells in staggered configuration to those around it so as not to be arranged vertically.

Each of the cells 52 are surrounded by miniature berms 54 to prevent mixing with adjacent cells, wherein the tops of the berms are positioned above the surface of the mesh. The berms may completely surround each of the cells so as to form a depression defining the cells. As such, the cells 52 are circumscribed by a raised region. The depression may be of sufficient volume to reversibly receive crystal-containing fluids to be imaged and analyzed.

3D printers also have a wide range of different materials that can be printed so it is not limited to only Nylon. Currently used third party Nylon mesh is not optimized for serial crystallography as it is originally designed as a filtering medium. The Nylon mesh described herein includes a commercially available filter disk (such as the nylon net products available from Merck Millipore, Ltd, Tullagreen, Cork, Ireland) used for filtration. It is repurposed here to immobilize crystals in slurry or in microfluidic droplets for data collection.

Another major benefit to printing this grid is being able to print it directly onto Mylar or other sealing material. This removes a rather unfriendly step in the process of loading where there is a higher likelihood of error. Combining the mesh and Mylar into one physically bonded or integrally molded piece makes it vastly easier to handle and place as compared to doing it individually. With the grid being printed directly on the Mylar the user simply places the mesh/Mylar combo, inserts the sample, and seals it with another piece of Mylar. This will vastly simplify the process of loading a sample holder and will also increase the likelihood of viable samples by the time the experiment is performed. This simplification will decrease the likelihood that air is introduced into the sample while loading and thus increase sample longevity and likelihood of success upon experimentation.

An embodiment of the invention features the sealing membrane 22 also serving as the crystal immobilizing substrate. In this instance, the sealing membrane would define cells 3D printed on its central regions, while leaving the topography of peripheral regions of the membrane smooth so as not to hinder sealing function. Smooth circumferential margins would also prevent sample deposition there, assuring that all samples are easily visualized and otherwise analyzed unhindered prior to being exposed to x-rays.

Different mesh configurations are possible with the 3D printing process. For example, circular cells may be generated. However, to optimize packing, square, hexagonal or other geometric cross-sections may be utilized. In some instances, a hexagonal cross-section may be a preferred configuration inasmuch as the packing geometry of two-dimensional arrays of droplets is hexagonal. FIG. 5B is a photomicrograph of a substrate printed with hexagonal cells 56 with similar topographical features as the mesh depicted in FIG. 5A.

Furthermore, mesh regions may be printed, separated by no-cell zones. For example, the inventors envision quadrants of cells, or upper half regions and bottom half regions of cells. This would allow for cataloging of crystals according to various stages of growth, or various structural artifacts or features (e.g., crystal decomposition, reduction, oxidation, complexation). For example, the creation of no-cell separation zones or of specific zones on the same film will optimize collection. Deposits of different samples (multiplexing) would be easily discernable. Crystals of different proteins or of same proteins but with different ligands can be analyzed side by side on the same film.

Generally the mesh configurations depicted in FIGS. 5A and 5B are flat, and may be semi rigid, or even flexible, the latter to serve as additional sealing means when assembled with the construct depicted in FIG. 1A. The mesh configurations may be curved so as to be mounted to a mesh holder defining a similar radius of curvature. As such, the mesh holder may also be curved.

Nylon Mesh 3D-Printing Detail

The following Table 2 are Nylon mesh printing variables. These variables are exemplary and empirically derived inasmuch as they may be manipulated drastically to receive different spacing, sizing, and geometric results CAD model (100 um) and manipulating infill parameters such that each pass of the printer deposits a line of material with a space between the next line of material. In general, this is not used in normal 3D print models as they would lose integrity and rigidity, but by leaving space between the lines, and repeating the next layer of material perpendicular with spaces, it results in a grid, or mesh, with empty wells or cells where no material exists. The geometry of wells can change depending on infill settings in the printer and line width, and line spacing. The printer is also manipulated so that only one or two layers of material are ever printed so that the resulting mesh can be on the order of 60 um thick.

This printable mesh has been optimized to be printed directly onto Mylar sheets as to both create an assembly that can be easily used for serial experiments, and to allow for easy removal from the print bed. This is accomplished by placing two overlapping sheets of Mylar (ranging in thickness from 2 microns (μm) to 12 μm (for example 6 μm) on the print bed directly onto the area were the mesh will be printed. The first sheet may be placed with the longer dimension horizontal, then smoothed as to allow no air underneath. The first sheet is then secured (for example with tape) to keep it in place, but not to introduce tension onto the sheet. Too much tension may result in the sheet snapping or otherwise pulling apart under the heat of the print nozzle. The second sheet is placed with a similar fashion, albeit vertically as opposed to horizontally on the print bed, and taped down with the same intention.

Preferably, the edges of the Mylar where the print nozzle may drag across are taped so as to avoid the print head catching and peeling up the Mylar. Once the print is complete, the top sheet of Mylar can be removed and the mesh will stay lightly adhered to the Mylar. The mesh can be easily removed from the Mylar is desired or left on for easy loading of a mesh holder.

Figure 6:
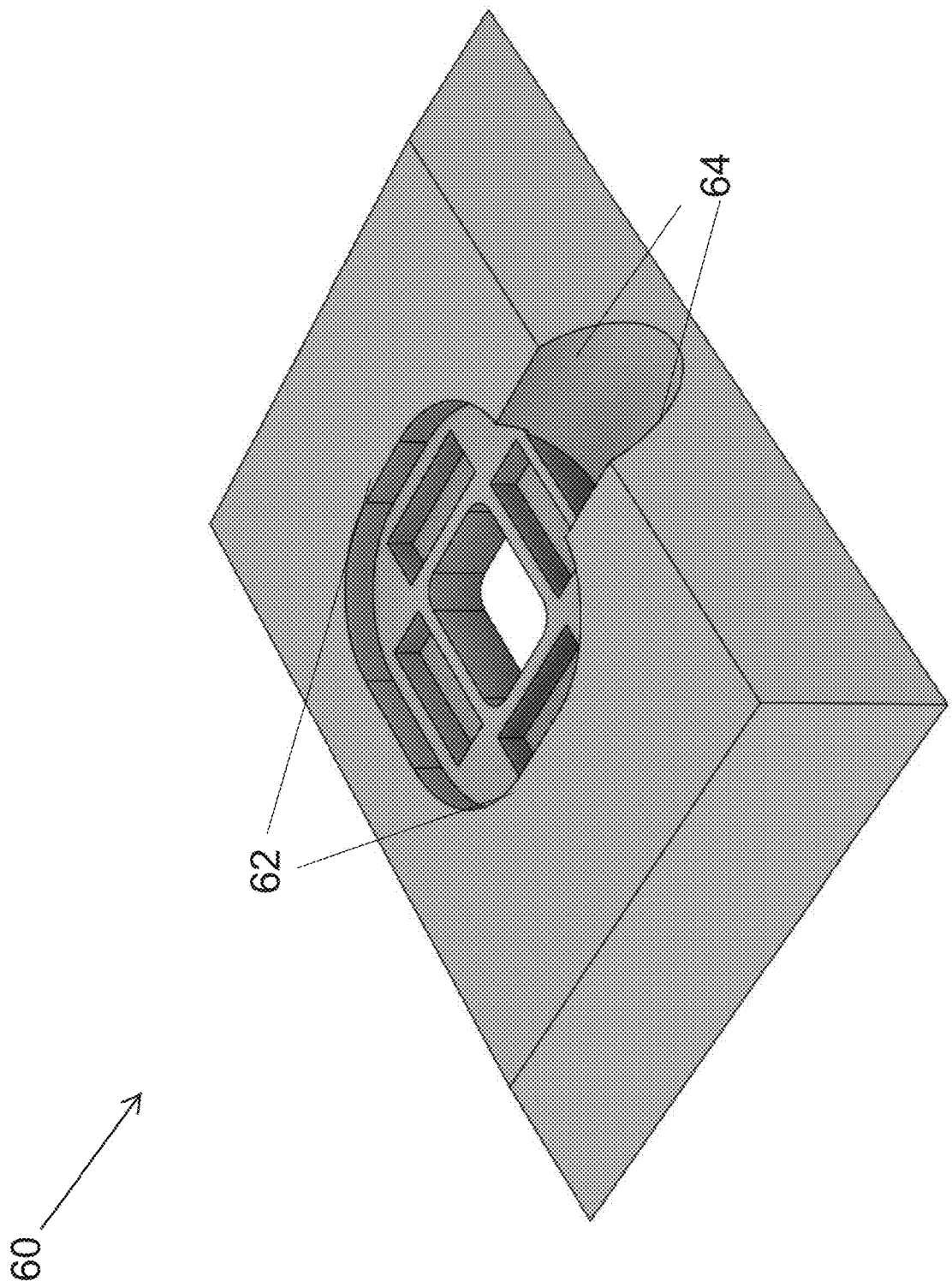
FIG. 6 is an isometric view of a loading plate, in accordance with features of the present invention.

FIG. 6 is an isometric view of a loading plate, generally designated as numeral 60 for use in the assembly of the crystal holder 10. The loading plate 60 enables easy loading of the mesh holder with sample. Like the mesh holder, the plate is 3D printed. Viewed in conjunction with FIG. 1, an upwardly facing surface of the plate 60 defines a cavity 62 having the topography complementary of the main section (e.g., first substrate 12) of the mesh holder in it, and therefore adapted to receive the first substrate 12.

TABLE 2

Nylon Mesh Printing Variables

| Parameter: | Value: | Description: |
| --- | --- | --- |
| Layer Height | 0.05 mm | This is set so that the printer will only ever print two layers within the mesh as to optimize well shape and thinness of the mesh |
| Initial Layer Height | 0.05 mm | This is set the same as above as to have two equal layers |
| Infill Line Width | 0.1 mm | This is set to minimize the width of the deposited lines as much as the printer will physically allow. |
| Infill Line distance | 0.4 mm | Creates space between the infill lines and will leave a gap between lines of deposited material. |
| Infill pattern | Lines | Specifies the orientation of deposited material |
| Infill Line Direction | [90, 0] | Specifies the specific direction of the "Line" pattern above. Making it be 90 degrees and 0 degrees as to print perpendicular lines resulting in a grid mesh. This parameter will change as the above "Infill Pattern" setting changes. |

Printing Nylon Mesh is another example of manipulation of printer variables in order to result in a desired outcome despite the software or printer not being designed for such an outcome. This is done by first printing a very thin solid The depth of the cavity 62 is such that when the first substrate 12 is placed in the cavity, and subsequently overlaid with the Mylar-Nylon-Mylar construction, that construct is flush and parallel with the top of the plate. Subsequently, the second half (i.e., the second substrate 16) can be placed along with the magnetic compression ring 18, thereby completing the loading process.

A region defining a periphery of the cavity 62 may define a cutout 64. This cutout 64 may be used for easy loading or unloading of the device to or from the loading plate 60. Or, the cutout 64 may be adapted to receive the boss 13 with which the structure 15' of the beamline later attaches or otherwise communicates after the device 10 is assembled.

Example

This invention comprises a 3D printable mesh holder for serial crystallography that solves many of the problems, complications, and costs of its predecessors. This holder was specifically designed to hold a mesh and sample solution in a simple, reliable, cost-effective, and user-friendly way. It was printed on a dual extrusion 3D printer in which a thin layer of NinjaFlex® material was printed followed by the ridged plastic which adheres the two layers making each side a single piece with two materials of different properties.

The invention can be 3D printed in under an hour, which creates ease of access and a low cost of use as well as a very simple but novel design which removes many of the separate pieces other solutions require. This holder is also easily reusable after the current sample is no longer needed.

This invention utilizes the 3D printed components by creating a compression ring that is magnetically and automatically compressed to seal the solution/mesh when the two halves are brought together. In-between these two 3D printed pieces are two pieces of Mylar (or other suitable sealing material) with the mesh and sample solution in-between.

The instant invention provides a modality for room temperature serial data collection for protein research including proteins comprising COVID-19. The invention provides a simple, rapid, and reliable method of collecting serial crystallography data on said proteins. The invented device and method provide rapid serial data collection widely applicable to the field of crystallography and additionally to COVID-19 research efforts.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The embodiment of the invention in which an exclusive property or privilege is claimed is defined as follows:

1. A device for positioning crystals, the device comprising:
   a. a first planar substrate defining a first transversely extending aperture, wherein the first substrate has a first laterally facing surface;
   b. a second planar substrate defining a second transversely extending aperture coaxial with the first aperture, wherein the second substrate has a second laterally facing surface;
   c. a third planar substrate and a fourth planar substrate positioned between the first and second substrates such that the first planar substrate, the second planar substrate, the third planar substrate and the fourth planar substrate are parallel; and
   d. a means for reversibly applying axial pressure to the first and second laterally facing surfaces so as to compress the third and fourth substrates together.

2. The device as recited in claim 1 wherein either the third substrate or the fourth substrate defines a plurality of cells adapted to receive the crystals.

3. The device as recited in claim 1 further comprising a fifth planar substrate positioned between the third and fourth substrates, wherein the fifth planar substrate is adapted to receive the crystals.

4. The device as recited in claim 3 wherein the crystals reside in cells formed in the fifth planar substrate.

5. The device as recited in claim 1 wherein either the first or second substrate is integrally molded with a flexible material, wherein the flexible material is different than either the first or second substrate.

6. The device as recited in claim 1 wherein the means for applying axial pressure comprises a first plurality of magnets in close spatial relationship to the first laterally facing surface, and a second plurality of magnets in close spatial relationship to the second laterally facing surface.

7. The device as recited in claim 6 wherein, the first plurality of magnets is supported by a sixth substrate defining an axially directed protuberance and the sixth substrate is slidably received by apertures formed in the second substrate such that the protuberance reversibly deforms the third substrate.

8. The device as recited in claim 1 wherein the first substrate defines a first periphery with a first topography, the second substrate defines a second periphery with a second topography such that the first topography is complementary to the second topography.

9. The device as recited in claim 7 wherein the third and fourth substrates each comprise a periphery that is positioned between a protrusion and the apertures.

10. The device as recited in claim 7 wherein the second substrate defines a second periphery defining a continuous depression adapted to receive the protuberance.

11. The device as recited in claim 1 wherein the third substrate and the fourth substrate consists of an optically transparent material selected from the group consisting of Mylar, Kapton, COC, Graphene, and combinations thereof.

12. The device as recited in claim 3 wherein the fifth substrate comprises a Nylon mesh and the third and fourth substrates comprise Mylar.

13. The device as recited in claim 2 wherein regions of the third and fourth substrates contain no cells.

14. The device as recited in claim 4 wherein the cells are varying sizes and define geometric shapes selected from the group consisting of circles, squares, polygons, hexagons, spheres, cubes, pyramids, geodesic polyhedrons and combinations thereof and combinations thereof.

15. The device as recited in claim 14 wherein different regions of the fifth substrate have different shaped cells.

16. The device as recited in claim 13 wherein the regions containing no cells are hydrophobic.

17. The device as recited in claim 4 wherein a variety of cell sizes are printed ranging from 10 to 100 micrometers in cross section.

18. The device as recited in claim 17 wherein the cell sizes are arranged in a predetermined pattern to facilitate serial imaging of crystals in various stages of growth.

19. The device as recited in claim 2 wherein different regions of the third or fourth substrate have different shaped cells.

20. The device as recited in claim 3 wherein different regions of the fifth substrate have different shaped cells.

* * * * *